United States Patent [19]

Fronzoni et al.

[11] 4,070,324
[45] Jan. 24, 1978

[54] CONTINUOUS PROCEDURE FOR THE PRODUCTION OF A DIENE BASED SYNTHETIC RUBBER LATEX WHOSE PARTICLE DIAMETER IS IN THE RANGE BETWEEN 1500 AND 4000 ANGSTROMS

[75] Inventors: Ferruccio Fronzoni, Ravenna; Carlo Giampaolo, San Donato Milanese, both of Italy

[73] Assignee: Anic, S.p.A., Palermo, Italy

[21] Appl. No.: 628,422

[22] Filed: Nov. 3, 1975

Related U.S. Application Data

[63] Continuation of Ser. No. 369,243, June 12, 1973, abandoned.

[30] Foreign Application Priority Data

June 24, 1972  Italy ................................... 26168/72

[51] Int. Cl.² .......................... C08L 9/00; C08L 9/04; C08L 9/08; C08L 9/10
[52] U.S. Cl. ...................... 260/29.7 D; 260/29.7 DP; 260/29.7 H; 260/29.7 W; 260/29.7 T; 526/329.1; 526/340; 526/342; 526/230
[58] Field of Search ........... 260/83.7, 29.7 H, 29.7 D, 260/29.7 DP, 29.7 W, 29.7 T, 82.7, 80.81, 82.3, 83.5

[56] References Cited

U.S. PATENT DOCUMENTS

| 3,255,161 | 6/1966 | Cobb | 260/83.7 |
| 3,547,857 | 12/1970 | Murray | 260/85.5 |
| 3,551,396 | 12/1970 | Lanthier | 260/85.7 |
| 3,563,946 | 2/1971 | Miller et al. | 260/29.7 |

OTHER PUBLICATIONS

Blackley, High Polymer Latices, I (Allied Science Publishers, Ltd. 1966), pp. 287–289.

*Primary Examiner*—Thomas De Benedictis, Sr.
*Attorney, Agent, or Firm*—Ralph M. Watson

[57] ABSTRACT

A diene based synthetic rubber latex, whose particle diameter is in the range between 1500 and 4000A, is prepared through an emulsion polymerization process wherein there is fed to a stirred autoclave system, the following ingredients:
 a. 100 parts of monomer consisting of a conjugated diene or a mixture having at least 80% constituted by one or more conjugated dienes and the balance selected from another monomer or monomers;
 b. From about 60 to 300 parts of a aqueous solution of organic emulsifying agent; and
 c. From 0.01 to 2 parts of polymerization promoter.

The temperature in the autoclave system is maintained in the range between 70° and 140° C during the polymerization and product is collected at a rate such that residence time in the autoclave system is between 2 and 30 hours.

3 Claims, No Drawings

CONTINUOUS PROCEDURE FOR THE PRODUCTION OF A DIENE BASED SYNTHETIC RUBBER LATEX WHOSE PARTICLE DIAMETER IS IN THE RANGE BETWEEN 1500 AND 4000 ANGSTROMS

This is a continuation, of application Ser. No. 369,243 filed June 12, 1973.

The present invention relates to a continuous process for the production of a diene based synthetic rubber latex useful as a raw material for the preparation of shock resistant resins, of the ABS type, which contain a rubber phase as a fine dispersion.

The diene based rubber latexes existing in commerce for this application must have particular characteristics, in particular a relatively large particle size (average diameter of the particles included between 1500 and 4000 A) having a low content of emulsifying agent (normally included between 1% and 4%). A common characteristic of these latexes also is a gel content included between 60% and 90%.

The processes used at present to obtain such rubbers are economically expensive and difficult to carry out both because of batchwise execution and because particular feeding techniques for the emulsifiers to the reactor, a reaction temperature of 50°–65° C and low water concentrations are required.

In fact, according to the known batchwise technique, initially only a small quantity of emulsifying agent is fed into the reactor, the remaining part having to be introduced during the reaction only in a quantity such as to stabilize the latex which is being formed. It is necessary to be very careful regarding the quantity added in that too large a quantity of emulsifying agent added during the reaction would result in loss in polymer particle size, while too small a quantity would favour the agglomeration of the particles existing in the emulsion.

On the other hand, the temperature must be accurately limited to a maximum of 50°–65° C. in order to avoid the formation of very small particles, although it should be noted that the temperature increases the reaction speed and therefore diminishes the residence time of the emulsion in the reactor.

Finally, even the quantity of water must be accurately limited in order to favor the formation of a few latex particles avoiding on the other hand the inversion of the emulsion. Residence times in the reactor, according to the known technique, are very long and reach 100 hours.

Even using the best conditions it should be observed that there is always the formation of considerable quantities of coagulum in the reactor, which causes a low yield and necessitates frequent cleaning of the plant.

Also the viscosities during the reaction are very high; which makes temperature control precarious.

Surprisingly, it has been found that it is possible to eliminate the previously mentioned drawbacks and at the same time obtain a rubber latex with the diameter of the particles included between 1500 and 4000 A, which can be used as a raw material for the production of ABS type resins operating under the following conditions.

The following ingredients seperately or in a mixture between themselves are fed continuously to an autoclave furnished with a stirrer or to the first autoclave of a group of autoclaves in series furnished with stirrers:

a. 100 parts of one or more monomers; in the case of a single monomer this is always a conjugated diolefin; in the case of more monomers one or more conjugated diolefins can be present provided that the conjugated diolefin or diolefins must be present in a total concentration not lower than 80% and the other monomers are chosen preferably from styrene, α-methyl styrene acrylonitrile, methacrylonitile, alkylic acrylates and methacrylates as such or as a mixture;

b. An aqueous solution containing from 60 to 300 parts of water and from 0.5 to 5 parts of one or more organic emulsifiers of the type commonly used for the polymerization in emulsion.

c. 0.01–2 parts of a polymerization promoter chosen from those generally used in the polymerization in emulsion. The flow rate at which these ingredients are fed to the reactor is such as to have a residence time sufficient to have a higher than 40% monomer conversion.

The temperature during the polymerization in emulsion is maintained in the range between 70° and 140° C. Residence times in autoclave are variable between 2 hours and 30 hours, according to the reaction temperature and therefore the productivity is much higher than that obtained with traditional techniques.

The other ingredients normally used in emulsion polymerization reactions for controlling the quality of the polymer and latex characteristics can be and are normally added to the fundamental ingredients mentioned above, and are for example:

A. A chain transferring agent, for example a mercaptan or a chlorinated hydrocarbon.

B. A strong electrolyte.

C. A substance able to chelate polyvalent ions.

The monomers used are preferably the following:

a. the conjugated diolefin is butadiene b. the possible comonomers are styrene and/or α-methylstyrene and/or acrylonitrile and/or methacrylonitrile and/or an alkylacrylate. The emulsifying agents used are preferably soaps of resinic acids, of fatty acids, of sulphonated hydrocarbons, of sulphosuccinic acids.

All the emulsifying agents known for the polymerization in emulsion capable of giving emulsions stable at the chosen polymerization temperature can be used however.

The polymerization promoter is preferably an organic or inorganic peroxide, for example potassium or ammonium persulphate, hydroperoxides of paramenthane or of di-isopropylbenzene or of tert butyl, di tert butyl peroxide.

EXAMPLES

1. To a stirred autoclave of 10 lt. capacity, thermostatically controlled at a temperature of 120° C, were fed by means of dosing pumps 1) 500 g./hr. of a, solution containing 0.10% of tert dodecyl mercaptan in butadiene.

2. 1000 g/hr of an aqueous solution containing 0.75% of a potassium soap of resinic acids, 0.25% of potassium chloride, 0.15% of potassium persulphate, 0.15% of a sodium salt of an alkyl-naphthalene-sulphonic acid.

The product was recovered by connecting the autoclave to a tank under pressure.

The unreacted monomer was removed from the produced latex by distillation with steam under vacuum.

When the conditions in the interior of the autoclave became stationary which could be considered to have happened after about 24 hours from the beginning of the feeding, the outflowing latex had the following characteristics. Time of residence 6 hours.

Solids content 28% by weight. Average particle diameter 2800 A. Gel content of the rubber 85% by weight.

2. To a group of two stirred autoclaves in series, of 10 lt. capacity equipped as in the previous example, and thermostatically controlled at the temperature of 90° C were fed 1) 400 g/hr of a mixture containing 0.10% of tert dodecyl mercaptan, 9.9% of Styrene, 90% of butadiene.

2. 500 g/hr of an aqueous solution containing 1.6% of a potassium soap of resinic acids, 0.25% of potassium persulphate, 0.5% of potassium chloride.

The product collected at stationary conditions, after about 40 hours from the beginning of feeding had the following characteristics. Residence time 20 hours. Solids content 40% by weight. Average particle size 3000 A. Gel content of the rubber 78% by weight.

3. To a stirred autoclave, of 10 lt. capacity equipped as in Example 1, maintained at a temperature of 110° C were fed 1. 500 g/hr of a mixture containing 0.15% of n-dodecyl mercaptan, 4.85% of acrylonitrile, 95% of butadiene.

2. 800 g/hr of an aqueous solution containing 0.65% of a potassium soap of fatty acids and 0.1% of tert butyl hydroperoxide.

The product collected at stationary conditions after about 30 hours from the beginning of the feed, had the following characteristics. Residence time was 7 hours. Solids content 33% by weight. Average diameter of the particles 2300 A. Gel content 86% by weight.

We claim:

1. Process for the continuous production of a diene based synthetic rubber latex whose particle diameter is in the range between 1500 and 4000 A through an emulsion polymerization including the steps of feeding to the first autoclave in a system consisting of a single autoclave furnished with a stirrer or a series of autoclaves furnished with stirrers the following ingredients separately or in admixture:
   a. 100 parts of a monomer consisting of a conjugated diolefin or of a mixture of monomers consisting of one or more conjugated diolefins at a total concentration of at least 80% and the balance selected from styrene, α-methylstyrene, acrylonitrile, methacrylonitrile, alkylic acrylates and methacrylates as such or in admixture;
   b. from 60 to 300 parts of water and from 0.5 to 5 parts of one or more organic emulsifying agents in solution in said water; and
   c. from 0.01 to 2 parts of a polymerization promoter, and collecting polymerization product from the autoclave system at a rate such that the residence time of such ingredients in the autoclave system is in the range between 2 hours and 30 hours, and maintaining the temperature in said autoclave system in the range between 70° and 140° C.

2. Process as claimed in claim 1 wherein the conjugated diolefin is butadiene.

3. Process as claimed in claim 1 wherein the polymerization promoter is tert butyl hydroperoxide.

* * * * *